April 25, 1961 S. G. WOODWARD 2,981,246
FUEL SUPPLY SYSTEM
Filed July 14, 1959 3 Sheets-Sheet 1

INVENTOR.
STEPHEN G. WOODWARD
BY
James L. O'Brien
ATTORNEY

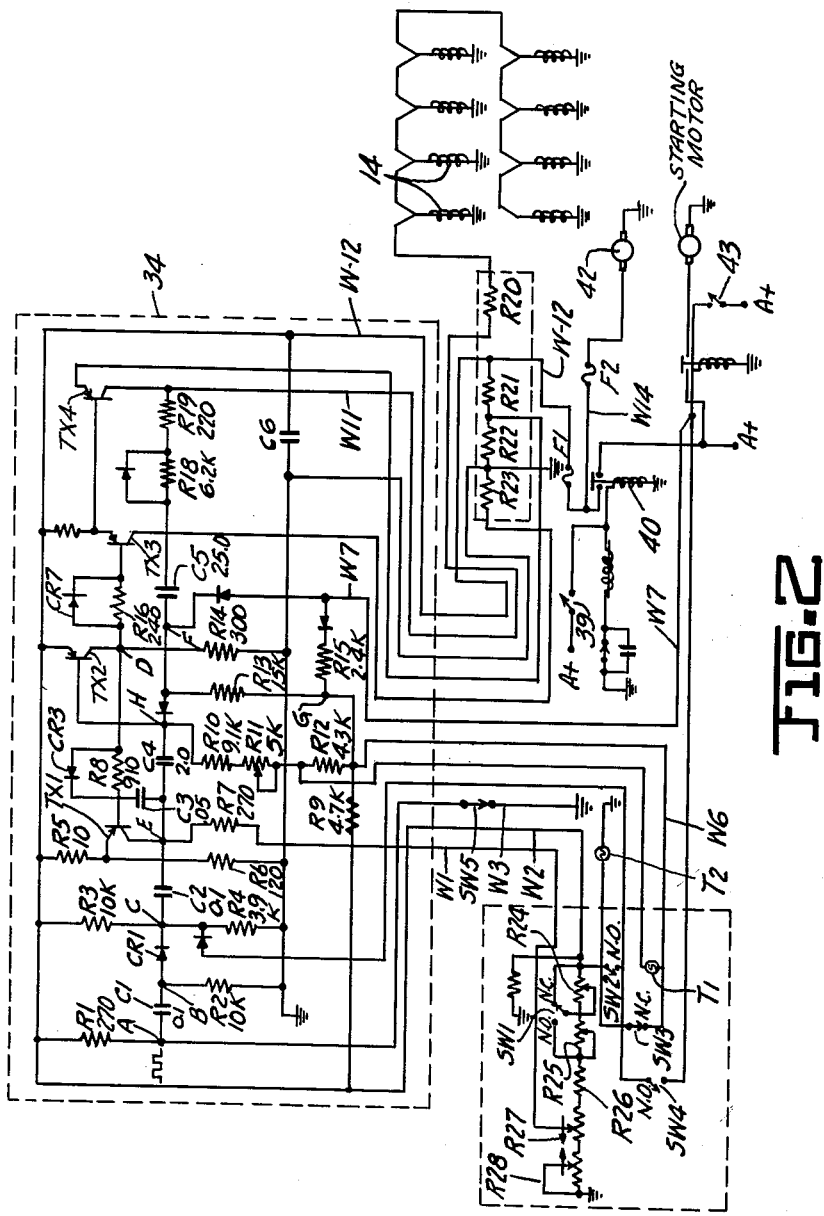

April 25, 1961 S. G. WOODWARD 2,981,246
FUEL SUPPLY SYSTEM
Filed July 14, 1959 3 Sheets-Sheet 3

INVENTOR.
STEPHEN G. WOODWARD
BY
James L. O'Brien
ATTORNEY

United States Patent Office 2,981,246
Patented Apr. 25, 1961

2,981,246

FUEL SUPPLY SYSTEM

Stephen G. Woodward, Elmira, N.Y., assignor to The Bendix Corporation, a corporation of Delaware Filed July 14, 1959, Ser. No. 826,962

3 Claims. (Cl. 123—119)

The present invention relates generally to a fuel supply system for a multicylinder internal combustion engine and more particularly to a system wherein the amount of fuel supplied to the engine is controlled by regulating the time duration of injection per engine cycle.

In copending application Serial No. 637,852 filed February 14, 1957, and assigned to the assignee of the present invention there is shown an electrical fuel supply system wherein an electronic modulator is triggered as a function of engine speed to discharge a pulse of electrical energy having a time duration or width regulated as a function of engine operating conditions. The modulator discharge pulse is connected through a distributor to successively open the solenoid actuated fuel valves respectively disposed adjacent the inlet valves of the engine. Thus in said copending application the injection may be said to be "timed," i.e. injection occurs at a predetermined time in the cycle of each cylinder of the engine.

I have discovered that a fuel supply system of the type disclosed in aforesaid copending application may be considerably simplified and the reliability and accuracy thereof improved without sacrifice of engine performance by utilizing "simultaneous" injection, i.e. all of the fuel valves or injectors are opened simultaneously for a predetermined time duration each engine cycle. With simultaneous injection two major advantages are provided over the prior timed injection system: (1) the distributor is eliminated thus eliminating the need for an extra drive connection to the engine and also eliminating a component which is subject to wear and failure and (2) longer durations of injection are permitted thus eliminating critical and expensive circuit elements and also permitting the fuel supply system to function more accurately over a very wide range of engine speed. In the prior art system the duration of injection was limited by the duration of contact of the distributor wiper arm with a contact segment which in an eight cylinder engine operating at 6000 r.p.m. with wide open throttle is in the order of 2.5 milliseconds. Since the wide open throttle duration of injection represents the maximum duration, operation of the engine at less than wide open throttle requires even shorter duration of injection thus imposing a severe requirement on the circuit elements and particularly the solenoid valves.

Accordingly it is an object of the present invention to provide a fuel supply system which has a wide range of operation and which is relatively simple in construction and reliable and accurate in operation;

Another object of the present invention is to provide a fuel supply system for a multicylinder engine wherein fuel is simultaneously discharged for each cylinder during each engine cycle.

These and other objects and advantages of the present invention will become apparent from the following description taken in connection with the accompanying drawing wherein:

Figure 2 is a circuit diagram of the modulator and sensors shown in Figure 1;

Figure 1:
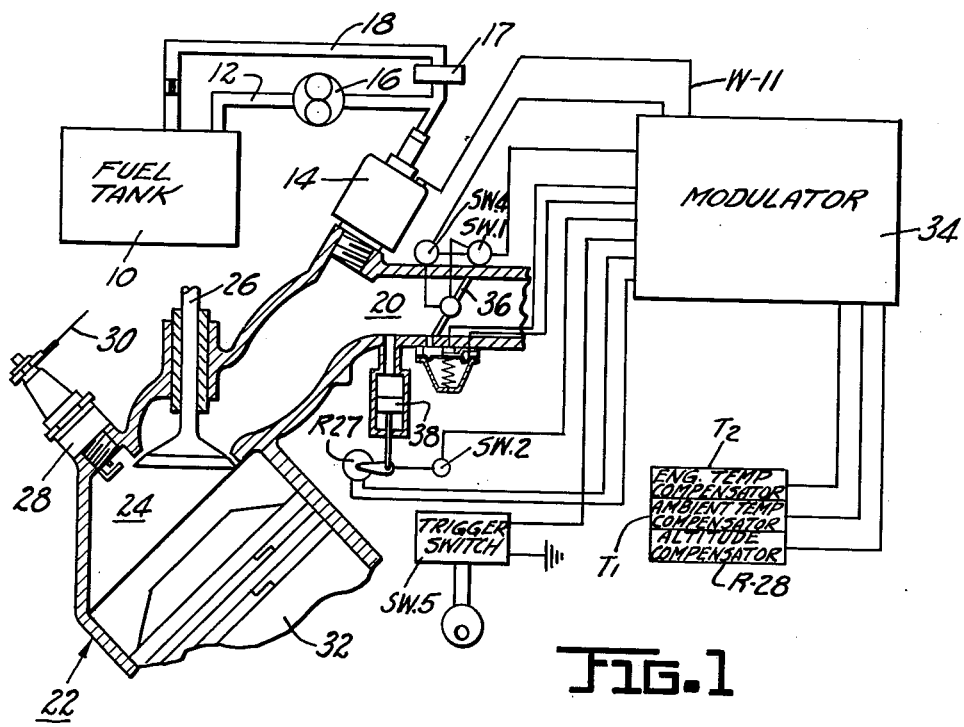
Figure 1 is a schematic view of a fuel supply system embodying the present invention.

Referring now to the drawings and more particularly to Figure 1, numeral 10 designates a fuel tank or source of fuel, 12 a conduit connecting the tank to an electrically actuable fuel valve or nozzle 14. Fuel in conduit 12 is placed under pressure by a pump 16 the discharge pressure of which is controlled by regulator 17. Excess fuel supplied to nozzle 14 is returned to the tank via conduit 18. Nozzle 14 is disposed to discharge into the induction passage 20 of an internal combustion engine designated generally by the numeral 22. Only a portion of one cylinder 24 of engine 22 is shown; but as illustrated includes an intake valve 26, spark plug 28 ignition lead 30 and piston 32.

Figure 8:
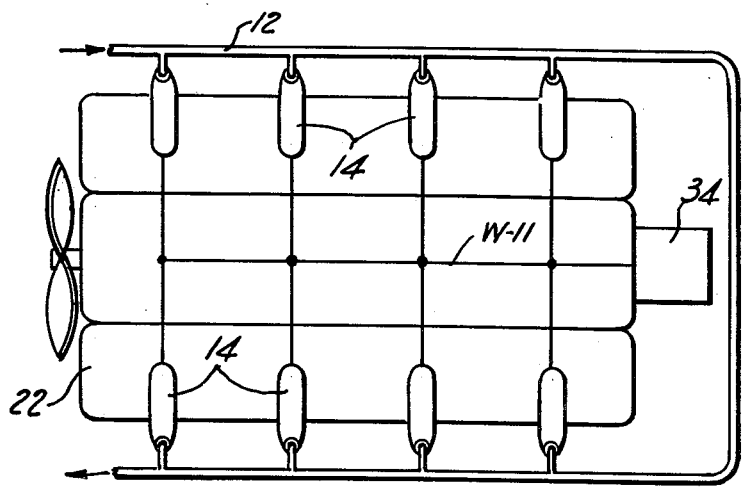
Figure 8 is a schematic view of the fuel supply system installed on an engine.

In Figure 8 engine 22 is shown having eight cylinders disposed in a V with a fuel nozzle provided for each cylinder. It is to be understood however that engine 22 may have any desired number of cylinders and the number of nozzles 14 may conveniently correspond to the number of engine cylinders although a greater or lesser number of nozzles may be used.

The time duration of fuel valve opening per engine cycle is controlled by a modulator 34 which is triggered by trigger switch SW-5 as a function of engine speed to produce an output pulse in wire W-11 which is connected to all of the nozzles 14. In a preferred embodiment trigger switch SW-5 is actuated once per engine cycle and all of the valves 14 actuated simultaneously to discharge fuel for a controlled time duration per engine cycle.

Sensors responsive to various engine operating conditions are connected to the modulator 34 to vary the pulse width or time duration of the output pulse of electric energy. As shown in Figure 1, idle switch SW-1 and unloader switch SW-4 are connected to throttle 36 which is mounted in induction passage 20. Degasser switch SW-2 and resistor R-27 are connected to a piston 38 which is moved in response to changes in induction passage pressure downstream of the throttle 36. Also provided are engine temperature compensator T2, ambient temperature compensator T1 and altitude compensator R-28.

The function of the various sensors will now be explained with reference to the modulator 34 which is shown schematically in Figure 2. Electric power is supplied to the system by closing the ignition switch 39 which energizes the modulator relay 40. When relay 40 is closed, A+ voltage, which may be a 12 volt battery, is supplied through the relay contacts, fuse F1 and wire W-12 to the modulator. Electric power is also fed through relay 40, fuse F2 and wire W-14 to the fuel pump motor 42.

Wire W-12 connects A+ through relay 40, resistor R-1, wire W-3 and trigger switch SW-5 to ground or reference potential. Actuation of switch SW-5 in synchronism with the engine produces a series of positive going square waves at junction A as shown in Figure 2. In a four cycle engine, switch SW-5 which is normally closed is opened once per cam shaft revolution and remains opened for about 10% of one cam shaft revolution. The positive signals at junction A cause capacitor C1 to charge through resistor R1 and R2. The time constant of the charge of C1 is selected to be appreciably smaller than the duration of the pulses at A so that the differential of the signal at junction A appears at junction B. The amplitude of the differential signal at B is nearly equal to A+ voltage. Diode CR1 removes the negative going portion of the differential signal and allows only a portion of the positive part of the differential signal to appear at junction C. A reference potential is provided at junction C by voltage divider R3 and R4 so that CR1 will not conduct until the positive portion of the signal at B exceeds the reference potential at C. The reference potential at junction C produces a clipping effect whereby noise pulses or other extraneous signals in trigger lead W–3 of lesser amplitude than the reference potential are removed.

The positive going trigger pulse appearing at junction C is coupled through capacitor C2 to the collector of transistor TX1. TX1 and TX2 form a collector coupled monostable multivibrator where TX2 is normally conducting and TX1 is normally cut off. Base current for TX2 is provided through the engine temperature compensator (thermistor) T2, normally closed acceleration switch SW–3, wire W–6, resistors R12, R11 and R10, and the base-emitter of TX2 to wire W–12. The current thus provided is more than adequate to maintain collector saturation in TX2 which essentially establishes A+ voltage at junction D and across resistor R14. The base of TX1 is connected to junction D through resistor R8. A voltage divider consisting of resistors R5 and R6 establishes a potential at the emitter of TX1 somewhat less than A+. Since the base of TX1 is at substantially A+ potential it is positive with respect to the emitter whereby TX1 is biased to cut off.

When a trigger signal appears at junction E it will be coupled through capacitor C4 to the base of TX2 causing the base voltage of TX2 to rise instantaneously and become positive with respect to the emitter potential whereby TX2 is biased to cut off. As TX2 is cut off, current will now flow through resistors R14 and R8, the base-emitter junction of TX1, R5 to wire W–12 thus turning on TX1. When TX1 switches on, the voltage at the emitter now appears at the collector of TX1 and junction E. Capacitor C4 which has been charged in a manner to be described subsequently is caused to discharge by the appearance of TX1 collector voltage at junction E. The discharge of C4 will cause the base voltage of TX2 to remain positive with respect to the emitter voltage of TX2 for a time duration depending upon the RC constant, the reference voltage across C4 prior to the trigger pulse and the base reference voltage to which C4 can discharge.

The reference voltage across C4 when the multivibrator is in its stable state, TX2 conducting and TX1 cut off, is equal to the difference between A+ potential at the base of TX2 and the potential at junction E.

Junction E is connected through resistor R7, wire W–1, induction passage pressure responsive potentiometer R27 and altitude responsive rheostat R28 to ground or reference potential. Potentiometer R27 and rheostat R28 are connected to A+ voltage through resistor R26, and depending upon the position of idle switch SW–1 through either light load calibrating resistor R25 or idle resistor R24, wires W–2 and W–12. Resistors R25 and R24 are manually adjusted to calibrate the system for a particular engine in the off idle and idle range of operation respectively. The voltage picked off by potentiometer R27 appears at junction E. For any given position of the slider of R27 the voltage picked off will be a function of the voltage drop across the other resistors in wire W–2. At sea level the voltage drop across rheostat R28 is substantially zero with voltage drop increasing with increase in altitude (decreasing ambient air pressure). At high induction passage absolute pressures the voltage appearing at the slider of potentiometer R27 is substantial zero with the voltage increasing with decreasing absolute pressures. With the slider of potentiometer R27 in the extreme left position as viewed in Figure 2, the potential at junction E would be determined by the position of the altitude rheostat R28. With the slider of R28 in the extreme right or sea level position and the slider of R27 in the extreme left position the potential at junction E would be substantially zero volts when the multivibrator is in the stable condition. At the respective opposite extremal positions of the sliders of R28 and R27 the potential at junction E will approach the value of the A+ potential.

Figure 3:
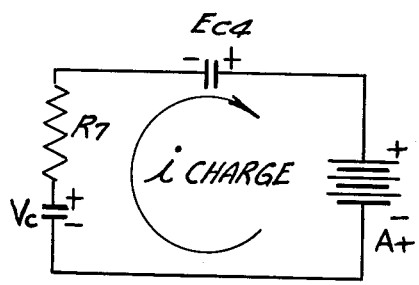
Figures 3 and 4 are simplified equivalent circuits of a portion of the circuit shown in Figure 2.
Figure 4:
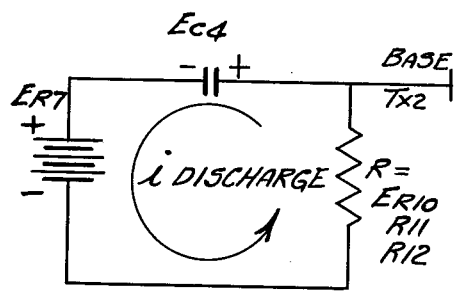

Figure 3 is a simplified equivalent circuit to show the charging circuit of C4. The voltage picked off by the slider of potentiometer R27 is the control voltage $V_C$ and the charging current flows in the direction of the arrow. In the charging of C4, one time constant is equal to C4 times R7. As noted previously, when TX1 conducts the emitter potential appears at junction E causing C4 to discharge. The discharge path of C4 is through the collector emitter junction of TX1, R5, W–12 the voltage source, thermistor T2, W–6 and resistors R12, R11, R10. Ambient air temperature responsive thermistor T1 is connected in parallel with R12 to form part of the discharge path. Figure 4 is a simplified equivalent circuit showing the discharge current of C4 flowing in the direction of the arrow. $E_{R7}$ is the voltage across R7 when TX1 is conducting, $E_{C4}$ is the voltage appearing across C4 as shown in Figure 4, and R is equal to the algebraic sum of R10, R11, R12, T1 and T2.

Figure 5:
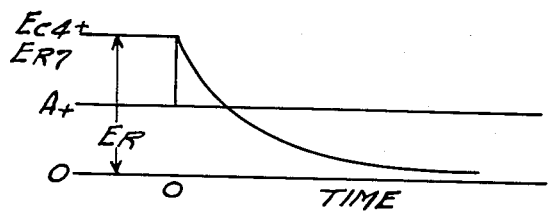
Figures 5, 6 and 7 are graphs showing certain operating conditions of the circuit of Figure 2.

As shown in Figure 5, at time equal zero (TX1 commences to conduct) the voltage across R is the sum of $E_{C4}$ and $E_{R7}$. As the discharge current decreases the voltage $E_R$ across resistance R decreases and when $E_R$ is equal to or slightly less than A+ TX2 will commence to conduct and the multivibrator will return to stable operation. It can thus be seen that the time the multivibrator remains in the astable state (TX1 conducting) is a function of the time constant C4 times R and the voltage $E_{C4}$. In the preferred embodiment the time constant is varied as a function of engine and ambient air temperatures and the voltage $E_{C4}$ is varied as a function of ambient air and induction passage pressures.

The output of the multivibrator is taken from junction D through resistor R16 to the base of transistor TX3. When the multivibrator is in its stable condition TX3 is biased to cut off. However, when TX2 is cut off, as when the multivibrator is in its astable condition, current will flow through R14, R16, and the base-emitter of TX3 sufficient to establish collector saturation for TX3. The emitter current of TX3 is equal to the sum of the TX3 base and collector currents. The emitter current of TX3 flows to the base of TX4 to cause TX4 to conduct. The output of TX4 is through the collector and wire W–11 to the electrically actuated solenoid fuel valves 14. Resistors R21 and R22 form a voltage divider network to establish bias voltage to maintain TX4 in the off condition when the multivibrator is in the stable condition.

Diode CR7 is connected in parallel with R16 to provide a low resistance path for leakage current $I_{co}$ of TX3. This leakage current varies directly with temperature. If the resistance to leakage current $I_{co}$ in the base circuit is appreciable, then at least a portion of the $I_{co}$ current will flow into the emitter. Since any current flow into the emitter is multiplied by the gain of the transistor and the total collector current is then equal to this leakage times the gain of the transistor, it is important to minimize $I_{co}$ flow through the emitter to prevent thermal instability. CR7 has very low forward resistance so that the major portion of $I_{co}$ flows through CR7 instead of the base-emitter of TX3. Both CR7 and TX3 are of the alloy junction type so that any change in the characteristics of TX3 due to temperature will be compensated for by an equivalent change in the characteristics of CR7. Diode CR3 performs a similar function for TX1.

In order to prevent spurious signals, such as may be caused by ignition pulses, from triggering the multivibrator, a capacitor C3 is connected between the base and collector of TX1 to form a feedback device. Capacitor C3 is selected to render the multivibrator insensitive to transients having a duration or width a predetermined amount less than the width of a trigger signal.

Figure 6:
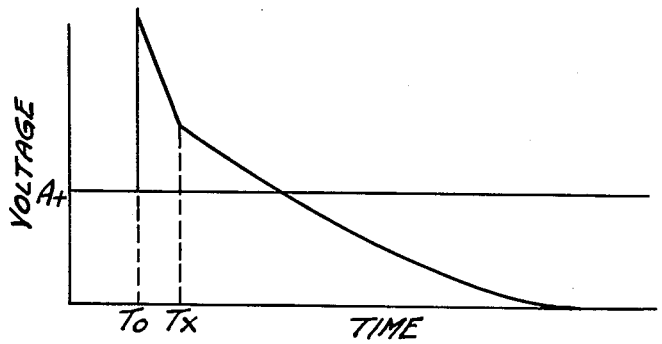

A cold starting circuit is provided to increase the amount of fuel injected during engine cranking. When the starting switch 43 (Figure 2) is closed, A+ voltage is connected through wire W-7 to junction F causing capacitor C5 to discharge in parallel with C4 whereby their time constants become additive. The closing of the starting switch 43 also establishes a potential at junction G through a voltage divider network comprising the parallel resistors R15 and R9 connected in series with T2 by means of wire W-6. The potential at G plus the charge on C4 must be equal to or less than A+ for TX2 to turn on. Thus the greater the reference potential G the lower the charge on C4 must be before TX2 in turned on. In order for C4 to discharge to a lower value a longer time is required and during this time TX2 remains off whereby TX4 is conducting to open fuel nozzles 14. As will be noted from the values of the C5 and its discharge resistors R18, R19, T2 and R13, shown in Figure 2 the time constant thereof is over ten times greater than the time constant of C4. Figure 6 graphically illustrates the effect of addition of C5 to the time constant of the multivibrator due to the cold starting circuit. At time zero (TX1 starts to conduct) both C4 and C5 commence to discharge but due to the presence of CR4 capacitor C5 has no influence on the potential at junction H until C4 has discharged sufficiently to cause junction H to become negative with respect to C5. Thus as shown in Figure 6, the potential at H follows the voltage decay of C4 from time $T_0$ to $T_x$. At time $T_x$, C5 becomes positive with respect to C4 and the potential at H thereafter follows the slower voltage decay of C5 until the potential at H becomes equal to or less than A+ voltage whereupon TX2 again commences to conduct.

Figure 7:
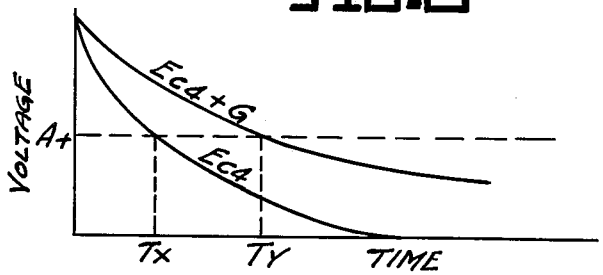

Figure 7 illustrates graphically the effect of the potential G on the time during which TX2 remains cut off. As shown in the graph at time $T_x$ the potential of C4 equals A+ but it is not until a later time $T_y$ that $E_{C4}$ plus $E_G$ equals A+. The time from $T_x$ to $T_y$ represents the increase duration of fuel discharge due to the effect of the cold start circuit on the potential at G. It should be noted with the starting switch open warm up enrichment will still occur due to the establishment of a potential at G through the voltage divider network wire W-12, resistor R9, wire W-6, thermistor T2 and ground.

Should the engine become flooded during starting means are provided to deload the engine in the form of switch SW-4. Switch SW-4 is connected to the throttle and is adapted to be closed when the throttle is in substantially wide open position. Closure of SW-4 connects A+ to junction C and prevents a trigger pulse from passing through CR1. Diode CR2 prevents current flow from R3 through SW-4 and the starter relay 40 to ground and thus prevents deloader interference with the clip level at C.

Accelerator switch SW-3 is normally closed and is temporarily opened by a sudden increase in induction passage pressure as occurs when the throttle is moved toward open position. The opening of SW-3 causes an open circuit in the base network of TX2 which maintains TX2 cut off as long as SW-3 is open.

Degasser switch SW-2 is normally open and is closed by the induction passage pressure responsive piston when the pressure has fallen below a predetermined value.

Closure of SW-2 connects A+ via wires W-12, W-2 and W-4 to junction C and prevents a trigger pulse from passing through diode CR1.

As best seen in Figures 2 and 8 the solenoid valves 14 are connected in parallel to be simultaneously opened each time a pulse is discharged by the electronic timing device or modulator 34. In a four cycle engine trigger switch SW-5 is actuated once per cam shaft revolution to cause modulator 34 to discharge a pulse of electrical energy thereby causing simultaneous injection from all of the nozzles once per engine cycle.

Although a particular embodiment of the invention has been described, it will be understood by those skilled in the art that the objects of the invention may be attained by use of constructions different in certain respects from that disclosed without departing from the underlying principles of the invention.

I claim:

1. In a fuel supply system for a multicylinder internal combustion engine having a source of fuel and a source of electric power, a nozzle for each of said cylinders, conduit means connecting said nozzles to said source of fuel, a valve in each of said nozzles, a circuit connected to said source of power, a solenoid for each of said valves energizable to open said valves, said solenoids being connected to said circuit in parallel for simultaneous energization, an electronic timing device in said circuit being energizable to pass current for controlled time duration whereby said solenoids will be energized to open said valves for a corresponding time duration, and means actuable as a function of engine speed for periodically energizing said timing device.

2. In a fuel supply system for a multicylinder internal combustion engine having a source of fuel, a source of electric power and an induction passage, a plurality of nozzles adapted to supply fuel to said engine, conduit means adapted to connect said nozzles with said source of fuel, a valve for each of said nozzles, an electric circuit adapted to be connected to said source of power, the solenoid for each of said valves being energizable to open said valves, said solenoids being connected to said circuit in parallel for simultaneous energization, a monostable multivibrator in said circuit, said multivibrator being energizable to pass current for controlled time duration whereby said solenoids will be energized to open said valves for a corresponding time duration, means responsive to induction passage pressure operatively connected to said multivibrator for regulating said time duration, and means for energizing said multivibrator in synchronism with engine speed.

3. In a fuel supply system for a multicylinder internal combustion engine having an induction passage and a source of fuel, a nozzle for each of said cylinders, conduit means connecting said nozzles to said source, an electrically actuable valve in each nozzle controlling the flow therethrough, an electric circuit, a monostable multivibrator in said circuit energizable to produce a pulse of electric energy of controlled time duration, means connecting said multivibrator to all of said nozzles simultaneously, means responsive to induction passage pressure operatively connected to said multivibrator for controlling the time duration of said pulse, and means for energizing said multivibrator as a function of engine speed.

No references cited.